Patented Sept. 29, 1942

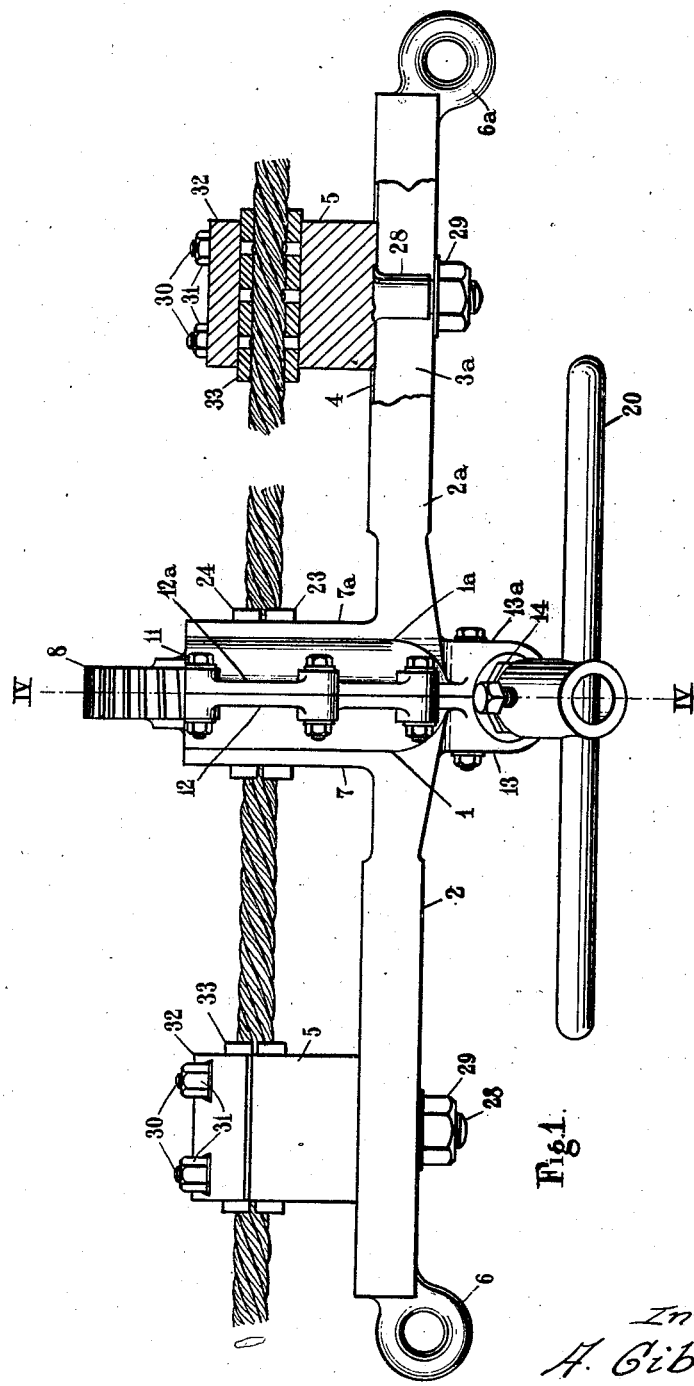

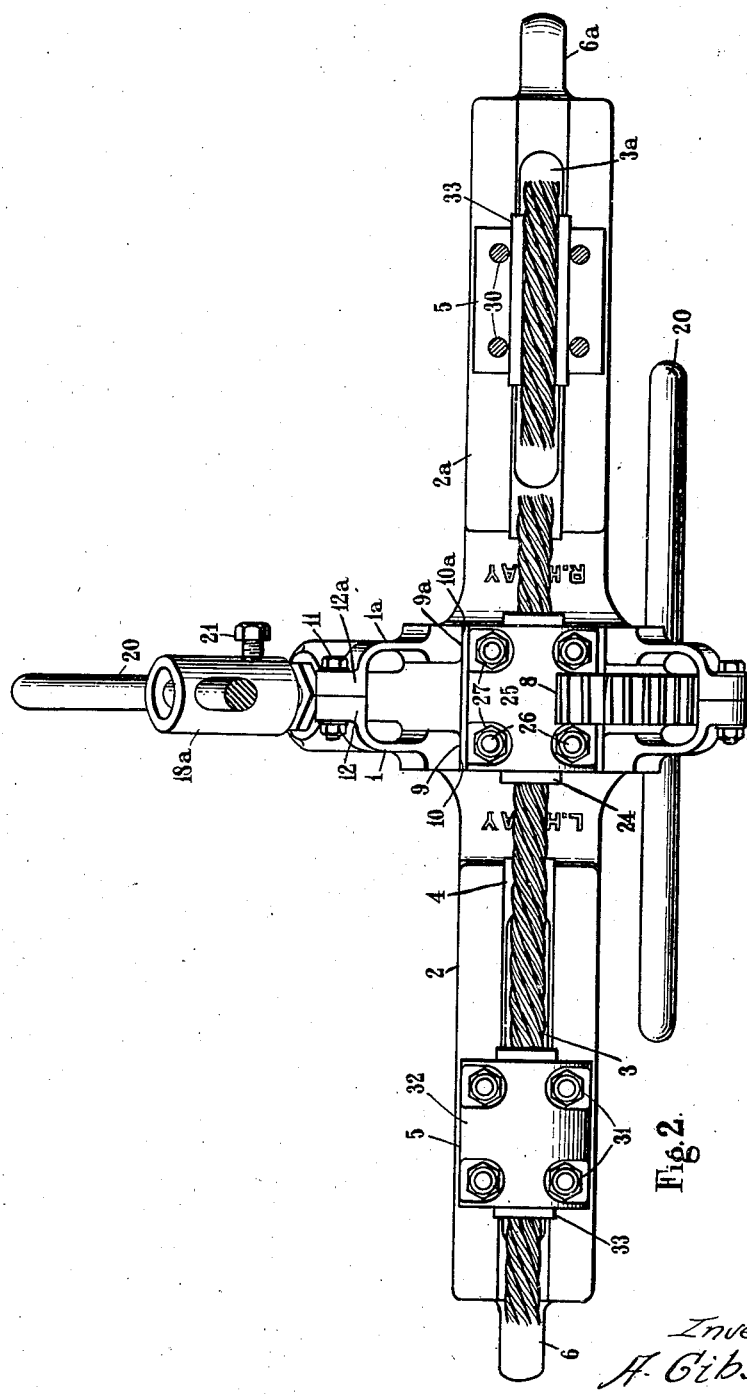

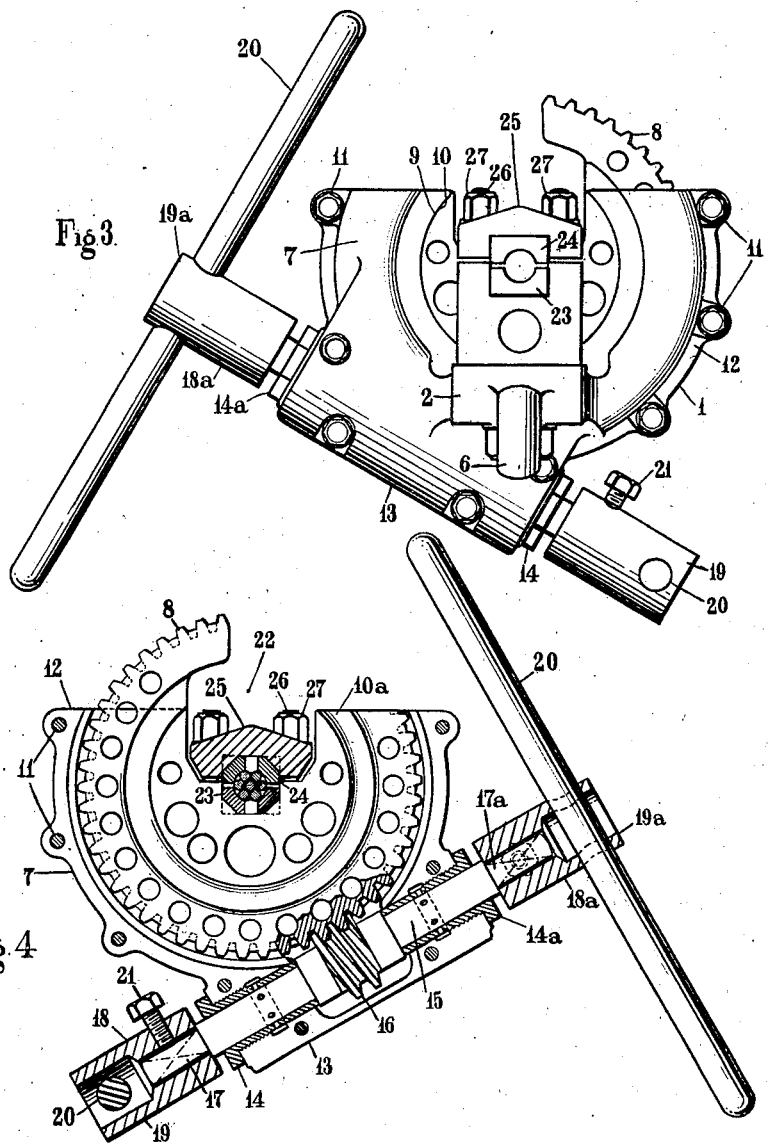

2,296,918

UNITED STATES PATENT OFFICE 2,296,918

APPARATUS FOR EXAMINING ROPES

Albert Gibson, Doncaster, England, assignor to British Ropes Limited, Doncaster, England Application January 27, 1941, Serial No. 376,241
In Great Britain January 30, 1940

3 Claims. (Cl. 57—1)

This invention relates to apparatus for inspecting wire ropes and has for its object to provide a device enabling wire ropes to be opened up in situ in order that their internal condition may be inspected or examined, and subsequently to be closed without disturbance of their lays or other detrimental effects.

The invention consists, broadly, in means whereby the rope may be clamped at two positions, spaced apart in the direction of its length and for effecting relative rotation of the portion of the rope between these positions in such manner as to effect unlaying of the strands thereof.

Thus, in accordance with the invention, the device may comprise a support to which is secured clamping means for engaging the rope and preventing its rotation about its axis and a further clamping means spaced therefrom and adapted to be rotated about the axis of the rope so that the portion of the rope between the fixed and the rotatable clamping means may be opened up to permit its internal condition to be examined or inspected.

Normally, in accordance with the invention, the fixed clamping means is detachably connected with the support and to facilitate the engagement of the clamping means with the support at varying distances, according to the lay of the rope to be opened up, from the rotatable clamping means a slot and an undercut guide may be provided in the support, while the fixed clamping means is arranged to be slid along this slot and secured in any desired position within the limits of the slot.

Preferably, the support is formed to deal with ropes of right-hand and left-hand lay and in such case it is furnished with means whereby the fixed clamping means may be located on the one or the other side of the rotatable clamping means.

For effecting rotation of the rotatable clamping means a worm and worm wheel drive may be provided.

Thus, in accordance with the invention, the rotatable clamping means may be engaged within a worm wheel or worm wheel segment rotatably mounted in an arcuate casing which provides a bearing for the worm wheel or worm wheel segment and which is furnished also with bearings provided with an extension in which are located bearings for the spindle of a worm co-operating with the worm wheel or worm wheel segment.

For imparting motion to the worm wheel or worm wheel segment the spindle may be provided with a handle element, for instance a handle element including a sleeve adapted to engage the spindle of the worm and furnished with holes through which a tommy bar or the like may be passed or is permanently engaged.

The portions of the clamping means adapted to engage the rope may be elements providing semi-cylindrical internal surfaces adapted to be detachably engaged in a holder split in a direction which will be parallel with the axis of the rope thus providing two parts which are connected together by a bolt and stud connection or equivalent means.

The invention will be described in detail and by way of example in reference to the accompanying drawings, in which:

Figure 1 is a view in elevation, partly in section;
Figure 2 is a plan view;
Figure 3 is a view in end elevation, and
Figure 4 is a view in section on a plane indicated at line IV—IV of Figure 1.

In the construction illustrated the support comprises two elements 1 and 1a of corresponding form, each comprising an arm 2 or 2a furnished with a slot 3 or 3a and an undercut or dove-tailed guide 4 or 4a for fixed clamping means 5 and at one end with an eye 6 or 6a adapted to be engaged by a rope in securing the support in position for the operation of the device, and at its opposite end with a section 7 or 7a forming one-half of an interrupted annular or arcuate casing for a worm wheel segment 8, the sections in question being provided with bearing surfaces 9 or 9a adapted to co-operate with journals 10 or 10a formed on the worm wheel segment at a position between its centre and its toothed portion.

The two elements 1 and 1a of corresponding form are connected together by bolts 11 passing through flanges 12 and 12a provided on the two halves of the arcuate casing which are formed with extensions 13 and 13a in which are located bearings 14 and 14a for a spindle 15 on which the worm 16 co-operating with the worm wheel segment is mounted, the spindle being furnished with squared ends 17 and 17a engaged by keys 18 or 18a each in the form of a sleeve 19 or 19a through which a tommy bar 20 or handle extends and provided with a set screw 21 whereby it may be secured in position on the spindle.

In the central portion of the worm wheel segment there is provided an aperture 22 in which is engaged one clamping jaw 23, the other clamping jaw 24 being engaged by a cap 25 removably secured to the worm wheel segment by studs 26 and nuts 27, the two jaws forming with the worm wheel the rotatable clamping means.

The fixed clamping means 5 is a block slidable in the guides 4 or 4a and furnished with a stud 28 adapted to extend through the slot 3 or 3a and with the stud there is associated a nut 29 for securing the fixed clamping means in the desired position.

The block is also furnished with studs 30 designed to be engaged by nuts 31 for securing a cap 32 thereto, and in turn secure in position jaws 33 adapted to engage the wire rope to be examined.

According to whether the rope is of right-hand or left-hand lay the block will be engaged in the guide provided in one or other of the two elements 1 and 1a. In opening the rope it will be appreciated that the worm wheel segment will be rotated in one direction and for reclosing the rope it will be rotated in the reverse direction.

I claim:

1. Apparatus for twisting a rope to open the lay thereof comprising, a worm gear, a casing embracing the worm gear, bearing surfaces carried by the casing, journals on said worm gear rotatably supporting the worm gear within the casing on said bearing surface, an integral extension carried by said casing, a spindle rotatably mounted in said extension, a worm within the extension meshing with the worm gear and secured to the spindle, means for rotating said spindle to turn said worm gear, rope clamping jaws mounted on the worm gear and in a radial aperture therein, a rigid arm carried by the casing, and non-rotatable clamping means detachably secured to said arm and spaced from said rope clamping jaws.

2. Apparatus for twisting a rope to open the lay thereof comprising, a two-part casing, a worm gear rotatably journaled in said casing, a spindle, an integral extension carried by each part of the casing embracing said spindle, bearings in said extensions rotatably supporting said spindle, a worm secured to said spindle within the extensions meshing with the worm gear, manually operable means for rotating said spindle, said worm gear having a radial aperture therein, jaw members removably secured to said worm gear for clamping a rope with the axis thereof substantially aligned with the axis of the worm gear, an integral arm extending laterally from one part of said casing, and rope clamping means mounted on said arm and spaced from said jaw members.

3. Apparatus for twisting a rope to open the lay thereof comprising a gear wheel having a radial aperture therein, a casing embracing the gear wheel, bearing surfaces carried by the casing, journals on said gear wheel rotatably supporting the gear wheel within the casing on said bearing surface, an integral extension carried by said casing, a spindle rotatably mounted in said extension, driving means within the extension meshing with the gear wheel and secured to the spindle, means for rotating said spindle to turn said gear wheel, rope clamping jaws mounted on the gear wheel and in the radial aperture therein, a rigid arm carried by the casing, and non-rotatable clamping means detachably secured to said arm and spaced from said rope clamping jaws.

ALBERT GIBSON.